United States Patent
Moscoso et al.

(10) Patent No.: US 11,040,885 B2
(45) Date of Patent: Jun. 22, 2021

(54) HIGH SURFACE AREA PENTASIL ZEOLITE AND PROCESS FOR MAKING SAME

(71) Applicant: UOP LLC, Des Plaines, IL (US)

(72) Inventors: Jaime G. Moscoso, Mount Prospect, IL (US); Deng-Yang Jan, Elk Grove Village, IL (US)

(73) Assignee: UOP LLC, Des Plaines, IL (US)

( * ) Notice: Subject to any disclaimer, the term of this patent is extended or adjusted under 35 U.S.C. 154(b) by 188 days.

(21) Appl. No.: 15/996,330

(22) Filed: Jun. 1, 2018

(65) Prior Publication Data

US 2018/0273392 A1   Sep. 27, 2018

Related U.S. Application Data

(63) Continuation-in-part of application No. 14/636,898, filed on Mar. 3, 2015, now abandoned.

(51) Int. Cl.
| | |
|---|---|
| *C01B 39/36* | (2006.01) |
| *C01B 39/40* | (2006.01) |
| *B01J 29/40* | (2006.01) |
| *B01J 29/46* | (2006.01) |
| *C01B 39/04* | (2006.01) |
| *B01J 29/072* | (2006.01) |
| *B01J 35/00* | (2006.01) |
| *B01J 35/10* | (2006.01) |
| *B01J 29/06* | (2006.01) |

(52) U.S. Cl.
CPC ............ *C01B 39/36* (2013.01); *B01J 29/072* (2013.01); *B01J 29/40* (2013.01); *B01J 35/002* (2013.01); *B01J 35/108* (2013.01); *B01J 35/1019* (2013.01); *B01J 35/1023* (2013.01); *B01J 35/1047* (2013.01); *C01B 39/04* (2013.01); *B01J 29/061* (2013.01); *B01J 2229/183* (2013.01); *C01P 2002/72* (2013.01); *C01P 2006/12* (2013.01)

(58) Field of Classification Search
CPC ... B01J 29/40; B01J 29/46; B01J 29/86; B01J 29/87; B01J 29/88; B01J 35/1019; C01B 39/36; C01B 39/40; C01P 2002/72; C01P 2006/12
See application file for complete search history.

(56) References Cited

U.S. PATENT DOCUMENTS

| | | | |
|---|---|---|---|
| 3,702,886 A | 11/1972 | Argauer | |
| 3,709,979 A * | 1/1973 | Chu | B01J 29/04 423/700 |
| 7,922,997 B2 | 4/2011 | Moscoso | |

FOREIGN PATENT DOCUMENTS

| | | |
|---|---|---|
| EP | 0018090 A1 | 10/1980 |
| WO | 2005/113439 A1 | 1/2005 |

OTHER PUBLICATIONS

Petushkov A. et al., Synthesis of hierarchial nanocrystalline ZSM-5 with controlled particle size and mesoporosity, Elsevier, Amsterdam NL, vol. 137, No. 1-3, Jan. 1, 2011.
Supplementary European Search Report EP application No. EP 15,75,9273, dated Sep. 24, 2018.
PCT International Search Report PCT/US2016/019221, dated Jun. 23, 2016.
Zhang et al., Differences between ZSM-5 and ZSM-11 zeolite catalysts in 1-hexene aromatization and isomerization, Fuel Processing Technology 91 (2010), 449-455 Elsevier B.V.
Liu et al, Catalytic conversion of ethanol over ZSM-11 based catalysts, Applied Catalysis A: General, Elsevier BV, 2016.

* cited by examiner

*Primary Examiner* — David M Brunsman
(74) *Attorney, Agent, or Firm* — Paschall & Associates, LLC; Mark Goldberg

(57) ABSTRACT

A family of crystalline aluminosilicate zeolites has been synthesized that is a layered pentasil zeolite. These zeolites are represented by the empirical formula:

$$M_m^{n+}R_r^{p+}Al_{1-x}E_xSi_yO_z$$

where M is an alkali, alkaline earth, or rare earth metal such as sodium or strontium, R can be a mixture of organoammonium cations and E is a framework element such as gallium, iron, boron, or indium. These zeolites are characterized by unique x-ray diffraction patterns and compositions and have catalytic properties for carrying out various hydrocarbon conversion processes.

The diffraction patterns can be characterized by the following table:

| 2Θ | d(Å) | I/Io |
|---|---|---|
| 7.92-7.99 | 11.04-11.31 | m |
| 8.79-8.88 | 9.94-11.09 | m |
| 20.28-20.56 | 4.31-4.35 | w |
| 23.10-23.18 | 3.83-3.84 | vs |
| 23.86-24.05 | 3.69-3.72 | m |
| 29.90-30.05 | 2.97-2.98 | w |
| 45.02-45.17 | 2.00-2.01 | w |

14 Claims, No Drawings

HIGH SURFACE AREA PENTASIL ZEOLITE AND PROCESS FOR MAKING SAME

CROSS-REFERENCE TO RELATED APPLICATION

This application is a Continuation-In-Part of copending application Ser. No. 14/636,898 filed Mar. 3, 2015, now abandoned, the contents of which cited application are hereby incorporated by reference in its entirety.

FIELD OF THE INVENTION

The present invention relates to a new family of aluminosilicate zeolites. This family of zeolites are pentasil zeolites similar to MFI type zeolites, and is characterized by unique x-ray diffraction patterns and compositions and have catalytic properties for carrying out various hydrocarbon conversion processes.

BACKGROUND

Zeolites are crystalline aluminosilicate compositions which are microporous and which are formed from corner sharing $AlO_2$ and $SiO_2$ tetrahedra. Numerous zeolites, both naturally occurring and synthetically prepared, are used in various industrial processes. Synthetic zeolites are prepared via hydrothermal synthesis employing suitable sources of Si, Al and structure directing agents such as alkali metals, alkaline earth metals, amines, or organoammonium cations. The structure directing agents reside in the pores of the zeolite and are largely responsible for the particular structure that is ultimately formed. These species balance the framework charge associated with aluminum and can also serve as space fillers. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversion reactions, which can take place on outside surfaces as well as on internal surfaces within the pore.

One particular zeolitic material, classified as ZSM-5, is disclosed in Beck, et al., U.S. Pat. No. 6,180,550, issued on Jan. 30, 2001. The zeolite comprises a synthetic porous crystalline material having a composition involving the molar relationship $$X_2O_3:(n)YO_2,$$

wherein X is a trivalent element, such as aluminum, boron, iron and/or gallium, preferably aluminum; Y is a tetravalent element such as silicon and/or germanium, preferably silicon; and n is less than 25, and Wherein the slope of the nitrogen sorption isotherm of the material at a partial pressure of nitrogen of 0.4 to 0.7 and a temperature of 77° K is greater than 30.

While there are many types of zeolites, new zeolites provide for improved reaction conditions in the conversion of lower value hydrocarbon streams to higher value hydrocarbon products.

SUMMARY

The present invention comprises a pentasil-layered zeolite having a microporous crystalline structure comprising a framework of $AlO_2$ and $SiO_2$ tetrahedral units, and an empirical composition in the as synthesized and anhydrous basis expressed by the empirical formula of $M_m^{n+}R_r^{p+}AlSi_yO_z$ where M is at least one exchangeable cation selected from the group consisting of alkali and alkaline earth metals, "m" is the mole ratio of M to Al and varies from 0 to 3, R is at least one organo cation selected from the group consisting of quaternary ammonium cations, diquaternary ammonium cations, quaternary phosphonium cations, and methonium cations, "r" is the mole ratio of R to Al and has a value of about 0.1 to about 30, "n" is the weight average valence of M and has a value of about 1 to about 2, "p" is the weighted average valence of R and has a value of about 1 to about 2, "y" is the mole ratio of Si to Al and varies from greater than 32 to about 200 and "z" is the mole ratio of O to Al and has a value determined by the equation $z=(m·n+r·p+3+4·y)/2$. The zeolite of claim 1 further characterized by the x-ray diffraction pattern having at least the d spacing and intensities set forth in the following Table A:

TABLE A

| 2Θ | d(Å) | I/I₀ |
|---|---|---|
| 7.92-7.99 | 11.04-11.31 | m |
| 8.79-8.88 | 9.94-11.09 | m |
| 20.28-20.56 | 4.31-4.35 | w |
| 23.10-23.18 | 3.83-3.84 | vs |
| 23.86-24.05 | 3.69-3.72 | m |
| 29.90-30.05 | 2.97-2.98 | w |
| 45.02-45.17 | 2.00-2.01 | w |

The zeolite of claim 1 wherein the zeolite has a microporous crystalline structure comprising a framework of $AlO_2$ and $SiO_2$ tetrahedral units, further including the element E and having the empirical composition in the as synthesized and anhydrous basis expressed by the empirical formula of $M_m^{n+}R_r^{p+}Al_{1-x}E_xSi_yO_z$ where "m" is the mole ratio of M to (Al+E) and varies from 0 to 3, "r" is the mole ratio of R to (Al+E) and has a value between 0.1 and 30, E is an element selected from the group consisting of gallium, iron, boron, indium and mixtures thereof, "x" is the mole fraction of E and has a value from 0 to 1.0, "y" is the mole ratio of Si to (Al+E) and varies from greater than 32 to 200 and "z" is the mole ratio of O to (Al+E) and has a value determined by the equation $z=(m·n+r·p+3+4·y)/2$. The zeolite of claim 1 wherein the zeolite has a mesopore surface area between 140 m²/g and 400 m²/g. The zeolite of claim 1 wherein M is selected from the group consisting of lithium, sodium, potassium, and mixtures thereof. The zeolite of claim 1 wherein M is a mixture of an alkali metal and an alkaline earth metal. The zeolite of claim 1 wherein R is selected from the group consisting of tetrabutylammonium hydroxide, tetrabutylphosphonium hydroxide, hexamethonium dihydroxide and mixtures thereof. The zeolite of claim 1 wherein R is a halide or hydroxide compound of an organoammonium cation. The zeolite of claim 1 wherein R is a mixture of tetrabutylammonium cation and a quaternary ammonium cation. The zeolite of claim 1 wherein the silica/alumina (Si/Al₂) ratio is between 64 and 400.

An embodiment of the invention is a process for the production of a pentasil-layered zeolite catalyst, comprising forming a reaction mixture comprising reactive compounds M, R, Al and Si; and reacting the mixture at reaction conditions, wherein the reaction conditions include a temperature between 80° C. and 150° C., and a reaction time between 10 hours and 5 days, to form a microporous crystalline structure comprising a framework of $AlO_2$ and $SiO_2$ tetrahedral units, and an empirical composition in the as synthesized and anhydrous basis expressed by the empirical formula of $M_m^{n+}R_r^+AlSi_yO_z$; wherein the reactive compounds include M, a cation selected from the group consisting of alkali and alkaline earth metals; R, an organoammonium cation selected from the group consisting of quaternary ammonium cations, diquaternary ammonium cations; and wherein "m" is the mole ratio of M to Al and varies from 0 to 3, "r" is the mole ratio of R to Al and has a value of between 0.1 and 30, "n" is the weight average valence of M and has a value of 1 to 2, "p" is the weighted average valence of R and has a value of 1 to 2, "y" is the mole ratio of Si to Al and varies from greater than 32 to 200 and "z" is the mole ratio of O to Al and has a value determined by the equation z=(m·n+r·p+3+4·y)/2. An embodiment of the invention is one, any or all of prior embodiments in this paragraph up through this embodiment in this paragraph further comprising the addition of reactive source E, wherein E is an element selected from the group consisting of gallium, iron, boron, indium and mixtures thereof, to form a microporous crystalline structure comprising a framework of $AlO_2$ and $SiO_2$ tetrahedral units, and an empirical composition in the as synthesized and anhydrous basis expressed by the empirical formula of $M_m^{n+}R^+$ $Al_{1-x}E_xSi_yO_z$; wherein m" is the mole ratio of M to (Al+E) and varies from 0 to 1, "r" is the mole ratio of R to (Al+E) and has a value between 0.1 and 30, "n" is the weight average valence of M and has a value of 1 to 2, "p" is the weighted average valence of R and has a value of 1 to 2, "x" is the mole fraction of E and has a value from 0 to 1.0, "y" is the mole ratio of Si to (Al+E) and varies from greater than 32 to 200 and "z" is the mole ratio of O to (Al+E) and has a value determined by the equation z=(m·n+r·p+3+4·y)/2. An embodiment of the invention is one, any or all of prior embodiments in this paragraph up through this embodiment in this paragraph where R is selected from the group consisting of tetrabutylammonium hydroxide, tetrabutylphosphonium hydroxide and mixtures thereof. An embodiment of the invention is one, any or all of prior embodiments in this paragraph up through this embodiment in this paragraph wherein R is a halide or hydroxide compound of an organoammonium cation. An embodiment of the invention is one, any or all of prior embodiments in this paragraph up through this embodiment in this paragraph where R is a mixture of tetrabutylammonium hydroxide and a quaternary ammonium cation. An embodiment of the invention is one, any or all of prior embodiments in this paragraph up through this embodiment in this paragraph where M is selected from the group consisting of sodium, potassium, and mixtures thereof. An embodiment of the invention is one, any or all of prior embodiments in this paragraph up through this embodiment in this paragraph where the reaction mixture is reacted at a temperature between 100° C. and 125° C. An embodiment of the invention is one, any or all of prior embodiments in this paragraph up through this embodiment in this paragraph where the reaction mixture is reacted at a temperature between 110° C. and 150° C.

Another, or second embodiment of the process of making the zeolite, is a process for the production of a pentasil MFI/MEL-layered zeolite catalyst having a 2-D structure, comprising forming a reaction mixture containing reactive sources of M, R, Al, and Si; and reacting the reaction mixture at reaction conditions of 80° C. to 150° C. for a period of time of between 10 hours and 5 days the reaction mixture having the a composition expressed in terms of mole ratios of the oxides of $aM_{2/n}ObR_{1\ 2/n}Oc$ $R_{2\ 2/n}Al_2O_3eSiO_2hH_2O$; wherein the reactive compounds include M, a cation selected from the group consisting of alkali, alkaline earth metals and mixtures thereof; R, an organoammonium cation selected from the group consisting of quaternary ammonium cations, diquaternary ammonium cations and mixtures thereof; Al in the form of $Al_2O_3$; and Si in the form of $SiO_2$; and wherein "a" has a value of 0.1 to 3, "b" has a value of 1 to 30, "c" has a value of 0 to 1, "e" has a value of 64 to 400 and "h" has a value of 50 to 1000. An embodiment of the invention is one, any or all of prior embodiments in this paragraph up through the second embodiment in this paragraph further comprising forming the reaction mixture with reactive source E, wherein E is an element selected from the group consisting of gallium, iron, boron, indium and mixtures thereof; and reacting the reaction mixture at reaction conditions of 85° C. to 225° C. for a period of time of 1 day to 15 days the reaction mixture having the a composition expressed in terms of mole ratios of the oxides of $aM_{2/n}ObR_{1\ 2/n}OcR_{2\ 2/n}1-dAl_2O_3dE_2O_3eSiO_2hH_2O$; wherein "a" has a value of 0.1 to 3, "b" has a value of 1 to 30, "c" has a value of 0 to 1, "d" has a value of 0 to 1, "e" has a value of 64 to 400 and "h" has a value of 50 to 1000.

Other objects, advantages and applications of the present invention will become apparent to those skilled in the art from the following detailed description.

DETAILED DESCRIPTION

A new family of zeolitic materials has been successfully prepared. The topology of this zeolite is unique as determined by its x-ray diffraction spectrum. The structure is related to MFI/MEL class of zeolite framework types.

There are many allotropes for zeolites having similar chemical formulae. The different allotropes can have very different physical and chemical properties, and can lead to many different uses. The easiest example is to look at the allotropes of carbon, a single type of atom but with many different structures, that leads to materials having, in some cases, diametrically opposed properties. Likewise for the allotropes of many zeolites, the discovery of new allotropes can be unexpected and their properties can also be unexpected and subsequently can lead to new uses from those properties.

For industrial catalytic application there is a need for zeolite of high external surface areas. Applicants have successfully prepared this new family of pentasil zeolites similar to MFI/MEL type zeolites. The materials are prepared via the use of a single commercially available structure directing agent, such as tetrabutylammonium hydroxide, using the Charge Density Mismatch Approach to zeolite synthesis (U.S. Pat. No. 7,578,993). The organoammonium compounds used to make this pentasil zeolite are non-cyclic or contain cyclic substituents and are generally quite simple. Examples of organoammonium compounds used to make this pentasil zeolite include tetrabutylammonium (TBA) and tetrabutylphosphonium (TBP) cation The present invention is a new pentasil layer zeolite and forms a porous structure that has a mesopore surface area between 140 $m^2/g$ and 400 $m^2/g$. The zeolite has a microporous crystalline structure comprising a framework of $AlO_2$ and $SiO_2$ tetrahedral units, and an empirical composition in the as synthesized and anhydrous basis expressed by the empirical formula of:

$$M_m^{n+}R_r^{p+}AlSi_yO_z.$$

In the formula, M is at least one exchangeable cation selected from the group consisting of alkali and alkaline earth metals, "m" is the mole ratio of M to Al and varies from about 0 to about 3, R is at least one organo cation selected from the group consisting of quaternary ammonium cations, diquaternary ammonium cations, quaternary phosphonium cations, and methonium cations, "r" is the mole ratio of R to Al and has a value of about 0.1 to about 30, "n" is the weight average valence of M and has a value of about 1 to about 2, "p" is the weighted average valence of R and has a value of about 1 to about 2, "y" is the mole ratio of Si to Al and varies from greater than 32 to about 200 and "z" is the mole ratio of O to Al and has a value determined by the equation:

$$z=(m \cdot n+r \cdot p+3+4 \cdot y)/2.$$

The zeolite is further characterized in that it has the x-ray diffraction pattern having at least the d spacing and intensities set forth in Table A:

TABLE A

| 2Θ | d(Å) | I/I$_0$ |
|---|---|---|
| 7.92-7.99 | 11.04-11.31 | m |
| 8.79-8.88 | 9.94-11.09 | m |
| 20.28-20.56 | 4.31-4.35 | w |
| 23.10-23.18 | 3.83-3.84 | vs |
| 23.86-24.05 | 3.69-3.72 | m |
| 29.90-30.05 | 2.97-2.98 | w |
| 45.02-45.17 | 2.00-2.01 | w |

The zeolite can be seen as characterized by the very strong peak in the x-ray diffraction pattern at 2θ from 23.10-23.18.

In one embodiment, the zeolite can be formed with a metal E. The zeolite forms a microporous crystalline structure and has the empirical composition in the as synthesized and anhydrous basis expressed by the empirical formula of:

where "m" is the mole ratio of M to (Al+E) and varies from 0 to 3, "r" is the mole ratio of R to (Al+E) and has a value of about 0.1 to about 30, E is an element selected from the group consisting of gallium, iron, boron, indium and mixtures thereof, "x" is the mole fraction of E and has a value from 0 to 1.0, "y" is the mole ratio of Si to (Al+E) and varies from greater than 32 to about 200 and "z" is the mole ratio of O to (Al+E) and has a value determined by the equation:

$$z=(m \cdot n+r \cdot p+3+4 \cdot y)/2.$$

The metal M can be a mixture of alkali metals and alkaline earth metals, with a preferred metal or metal combination comprising one or more of lithium, sodium and potassium. The organo cation can comprise an organoammonium ion such as tetrabutylammonium cation, or an organophosphonium ion such as tetrabutylphosphonium cation, or a methonium ion such as hexamethonium cation. These can be selected for the reaction mixture to form the zeolite from tetrabutylammonium hydroxide, tetrabutylphosphonium hydroxide, and hexamethonium dihydroxide. The R can be selected from a mixture of quaternary organoammonium cations. The R can be a halide or a hydroxide of the organoammonium cation. A preferred R comprises a mixture of tetrabutylammonium cation and a quaternary ammonium cation.

The pentasil zeolite formed will have a silica to alumina ratio (Si/Al$_2$) ratio is between 32 and 400.

The pentasil-zeolite is formed by creating a reaction mixture comprising reactive compounds having M, R, Al and Si. The reaction mixture is reacted under reaction conditions that include a temperature between 80° C. and 150° C., and a reaction time between 10 hours and 5 days. This forms a microporous crystalline structure comprising a framework of AlO$_2$ and SiO$_2$ tetrahedral units, and an empirical composition in the as synthesized and anhydrous basis expressed by the empirical formula of:

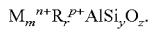

The process can further include adding the additional reactive source E, wherein E is an element selected from one or more of the metals: gallium, iron, boron and indium to form the structure with the empirical composition in the as synthesized and anhydrous basis expressed by the empirical formula of:

The reaction temperature is preferred to be between 100° C. and 125° C., or with a preferred reaction temperature between 110° C. and 150° C.

In one embodiment, the process to produce the zeolite includes forming a reaction mixture with the reactive sources of M, R, Al, and Si. The mixture is reaction at a temperature between 80° C. to 150° C. for a period of time of between 10 hours and 5 days and the reaction mixture has a composition expressed in terms of mole ratios of the oxides of:

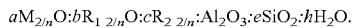

The reactive sources include M, a cation selected from alkali or alkaline earth elements; R an organoammonium cation; Al in the form of Al$_2$O$_3$; and Si in the form of SiO$_2$. In the mixture, the value of "a" is between 0.1 and 3, the value of "b" is between 1 and 30, the value of "c" is between 0 and 1, the value of "e" is between 64 and 400, and the value of "h" is between 50 and 1000.

The process can further include adding the additional reactive species E, wherein E is one or more elements from gallium, iron, boron and indium. The reaction conditions include a temperature between 85° C. and 225° C. for a period from 1 day to 15 days. The reaction mixture has a composition expressed in terms of mole ratios of the oxides of:

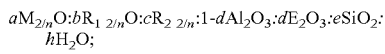

wherein "a" has a value of 0.1 to 3, "b" has a value of 1 to 30, "c" has a value of 0 to 1, "d" has a value of 0 to 1, "e" has a value of 64 to 400 and "h" has a value of 50 to 1000.

The structure of the zeolite of this invention was determined by x-ray analysis. The x-ray patterns presented in the following examples were obtained using standard x-ray powder diffraction techniques. The radiation source was a high-intensity, x-ray tube operated at 45 kV and 35 ma. The diffraction pattern from the copper K-alpha radiation was obtained by appropriate computer based techniques. Flat compressed powder samples were continuously scanned at 2° to 70° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "I$_o$" being the intensity of the strongest line or peak, and "I" being the intensity of each of the other peaks. For high throughput samples, diffraction patterns were collected on the Bruker-AXS GADDS diffractometer equipped with an area detector, which covered 2Θ=3-38°.

As will be understood by those skilled in the art the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of 100× $I/I_o$, the above designations are defined as: w=0-15; m=15-60: s=60-80 and vs=80-100.

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

Example 1

An aluminosilicate reaction solution was prepared by first mixing 13.15 g of aluminum tri-sec-butoxide (95+%), 777.62 g tetrabutylammonium hydroxide (55 mass-% solution), and 700 g of ice water mixture while stirring vigorously. After thorough mixing, 1167.98 g tetraethyl orthosilicate was added. The reaction mixture was homogenized for an additional hour with a high speed mechanical stirrer. A composite aqueous solution containing 2.75 g of NaOH dissolved in 137.7 g distilled water was added, drop-wise, to the aluminosilicate solution. After the addition was completed, the resulting reaction mixture was homogenized for 1 hour, transferred to a 2000 ml Parr stainless steel autoclave which was heated to 115° C. and maintained at that temperature for 59 hrs. The solid product was recovered by centrifugation, washed with de-ionized water, and dried at 80° C.

The product was identified as a pentasil zeolite by powder x-ray diffraction. Representative diffraction lines observed for the product are shown in Table 1. The product composition was determined by elemental analysis to consist of the following mole ratios: Si/Al=59.8, Na/Al=0.82. A portion of the material was calcined by ramping to 560° C. for 5 hours followed by an 8 hour dwell in air. The BET surface area was 697 m²/g, the micropore area was 474 m²/g, the mesopore area was 223 m²/g, the micropore volume was 0.253 cc/g, and mesopore volume was 0.953 cc/g. Scanning Electron Microscopy (SEM) revealed clusters of nano spheres of less than 20 nm. Chemical analysis was as follows: 0.74% Al, 46.0% Si, and 0.52% Na, Na/Al=0.82, Si/Al$_2$=119.

TABLE 1

| 2θ | d(Å) | I/I$_0$ % |
|---|---|---|
| 7.92 | 11.15 | m |
| 8.8 | 10.04 | m |
| 20.38 | 4.35 | w |
| 23.13 | 3.84 | vs |
| 23.98 | 3.7 | m |
| 29.96 | 2.98 | w |
| 45.14 | 2 | w |

Example 2

An aluminosilicate reaction solution was prepared by first mixing 13.87 g of aluminum tri-sec-butoxide (95+%), 386.39 g tetrabutylammonium hydroxide (55 mass-% solution), and 300 g of ice water mixture while stirring vigorously. After thorough mixing, 580.35 g tetraethyl orthosilicate was added. The reaction mixture was homogenized for an additional hour with a high speed mechanical stirrer. A composite aqueous solution containing 2.73 g of NaOH dissolved in 116.67 g distilled water was added, drop-wise, to the aluminosilicate solution. After the addition was completed, the resulting reaction mixture was homogenized for 1 hour, transferred to a 2000 ml Parr stainless steel autoclave which was heated to 115° C. and maintained at that temperature for 57 hrs. The solid product was recovered by centrifugation, washed with de-ionized water, and dried at 80° C.

The product was identified as a pentasil zeolite by powder x-ray diffraction. Representative diffraction lines observed for the product are shown in Table 2. The product composition was determined by elemental analysis to consist of the following mole ratios: Si/Al=24.9, Na/Al=0.92. A portion of the material was calcined by ramping to 560° C. for 5 hours followed by a 8 hour dwell in air. The BET surface area was 517 m²/g, the micropore area was 258 m²/g, the mesopore area was 259 m²/g, the micropore volume was 0.135 cc/g, and mesopore volume was 0.94 cc/g. Scanning Electron Microscopy (SEM) revealed clusters of nano spheres of less than 20 nm. Chemical analysis was as follows: 1.73% Al, 44.9% Si, and 1.37% Na, Na/Al=0.93, Si/Al$_2$=49.8.

TABLE 2

| 2θ | d(Å) | I/I$_0$ % |
|---|---|---|
| 7.94 | 11.12 | m |
| 8.79 | 10.04 | m |
| 20.38 | 4.35 | w |
| 23.16 | 3.83 | vs |
| 23.86 | 3.72 | m |
| 29.96 | 2.98 | w |
| 45.07 | 2.00 | w |

Example 3

An aluminosilicate reaction solution was prepared by first mixing 13.73 g of aluminum tri-sec-butoxide (95+%), 559.89 g tetrabutylphosphonium hydroxide (40 mass-% solution), and 200 g of ice water mixture while stirring vigorously. After thorough mixing, 574.76 g tetraethyl orthosilicate was added. The reaction mixture was homogenized for an additional hour with a high speed mechanical stirrer. A composite aqueous solution containing 2.70 g of NaOH dissolved in 48.92 g distilled water, was added, drop-wise, to the aluminosilicate solution. After the addition was completed, the resulting reaction mixture was homogenized for 1 hour, transferred to a 2000 ml Parr stainless steel autoclave which was heated to 115° C. and maintained at that temperature for 120 hrs. The solid product was recovered by centrifugation, washed with de-ionized water, and dried at 80° C.

The product was identified as a pentasil zeolite by powder x-ray diffraction. Representative diffraction lines observed for the product are shown in Table 3. The product composition was determined by elemental analysis to consist of the following mole ratios: Si/Al=33.78, Na/Al=0.67. A portion of the material was calcined by ramping to 560° C. for 5 hours followed by a 8 hour dwell in air. The BET surface area was 526 m²/g, the micropore area was 220 m²/g, the mesopore area was 306 m²/g, the micropore volume was 0.115 cc/g, and mesopore volume was 0.99 cc/g. Scanning Electron Microscopy (SEM) revealed clusters of nano spheres of less than 20 nm. Chemical analysis was as follows: 1.22% Al, 42.8% Si, and 0.70% Na, Na/Al=0.67, Si/Al$_2$=67.5.

TABLE 3

| 2θ | d(Å) | I/I$_0$ % |
|---|---|---|
| 7.99 | 11.04 | m |
| 8.88 | 9.94 | m |
| 20.50 | 4.32 | w |
| 23.16 | 3.83 | vs |
| 24.05 | 3.69 | m |
| 30.05 | 2.97 | w |
| 45.02 | 2.01 | w |

Example 4

An aluminosilicate reaction solution was prepared by first mixing 2.17 g of aluminum tri-sec-butoxide (95+%), 362.46 g tetrabutylammonium hydroxide (55 mass-% solution), and 300 g of water ice while stirring vigorously. After thorough mixing, 544.42 g tetraethyl orthosilicate was added. The reaction mixture was homogenized for an additional hour with a high speed mechanical stirrer. A composite aqueous solution containing 0.85 g of NaOH dissolved in 90.10 g distilled water was added, drop-wise, to the aluminosilicate solution. After the addition was completed, the resulting reaction mixture was homogenized for 1 hour, transferred to a 2000 ml Parr stainless steel autoclave which was heated to 115° C. and maintained at that temperature for 48 hrs. The solid product was recovered by centrifugation, washed with de-ionized water, and dried at 80° C.

The product was identified as a pentasil zeolite by powder x-ray diffraction. Representative diffraction lines observed for the product are shown in Table 4. The product composition was determined by elemental analysis to consist of the following mole ratios: Si/Al=202, Na/Al=1.33. A portion of the material was calcined by ramping to 560° C. for 5 hours followed by an 8 hour dwell in air. The BET surface area was 567 m$^2$/g, the micropore area was 206 m$^2$/g, the mesopore area was 361 m$^2$/g, the micropore volume was 0.11 cc/g, and mesopore volume was 0.92 cc/g. Scanning Electron Microscopy (SEM) revealed clusters of nano spheres of less than 20 nm. Chemical analysis was as follows: 0.22% Al, 46.2% Si, and 0.22% Na, Na/Al=1.33, Si/Al$_2$=404.

TABLE 4

| 2θ | d(Å) | I/I$_0$ % |
|---|---|---|
| 7.98 | 11.07 | m |
| 8.88 | 9.94 | m |
| 23.20 | 3.83 | vs |
| 24.06 | 3.69 | m |
| 29.9 | 2.98 | w |
| 45.22 | 2.00 | w |

Example 5

An aluminosilicate gel was prepared by first mixing 1.33 g liquid sodium aluminate (LSA), 8.37 g of dimethyldipropylammonium hydroxide of 39.8% content, 2.4 g of diethanolamine and 27.93 g of water vigorous stirring using a heidolph mixer, followed by adding 0.27 g of potassium hydroxide dissolved in 13.65 g of water. Finally it was added 12.22 g of Ultrasil (89% SiO2) and 13.81 g of water. The reaction mixture was homogenized for an additional ½ hour. It was then transferred to (3) 45 ml Parr stainless steel autoclave. The autoclave was heated to 175° C. into a rotisserie oven for 18 hrs. The solid products were recovered by filtration, washed with de-ionized water and dried at 100° C. The product was identified as pentasil by x-ray diffraction.

Example 6

An aluminosilicate gel was prepared by first mixing 23.35 g liquid sodium aluminate (LSA), 146.55 g of dimethyldipropylammonium hydroxide of 39.8% content, 41.72 g of diethanolmine and 800 g of water vigorous stirring using a heidolph mixer, followed by adding 4.72 grs of KOH dissolved 100 grs of water. Finally, it was added to 214.76 g of Ultrasil (89% SiO2) and 68.91 g of water. The reaction mixture was homogenized for an additional ½ hour. It was then transferred to 2-L stir Parr stainless steel autoclave. The autoclave was heated to 175° C. in two hours and kept at 175° C. for 18 hours at 300 RPM. The solid products were recovered by filtration/centrifugation, washed with de-ionized water and dried at 80° C. The product was identified as a pentasil zeolite by x-ray diffraction. Scanning Electron Microscopy (SEM) revealed small crystals. Chemical analysis 1.63% Al, 45.5% Si, 0.15% Na, 0.13% K, Si/Al2=53.75. Surface area 360 m2/g, micropore volume 0.16 cc/g, a MSA of 52 m2/g and TPV of 0.36 cc/g. The sample was calcined and NH4 exchanged using a 1M NH4NO3 solution at 75° C. for 1 hr. the final sodium level was 0.002%.

Example 7

An aluminosilicate gel was prepared by first mixing 24.08 grs liquid sodium aluminate (LSA), 148.9 g of dimethyldipropylammonium hydroxide of 40.4% content and 800 grs of water under vigorous stirring using a heidolph mixer, followed by adding 4.87 g of KOH dissolved 100 grs of water. Finally, it was added 221.49 grs of Ultrasil (89% SiO2) and 100.66 grs of water. The reaction mixture was homogenized for an additional ½ hour. It was then transferred to 2-L stir Parr stainless steel autoclave. The autoclave was heated to 175° C. in two hours and kept at 175° C. for 18 hours at 300 RPM. The solid products were recovered by filtration/centrifugation, washed with de-ionized water and dried at 80° C. The product was identified as a pentasil zeolite by x-ray diffraction. Scanning Electron Microscopy (SEM) revealed small crystals. Chemical analysis 1.65% Al, 44.9% Si, 0.33% Na, 0.38% K, Si/Al2=52.31. Surface area 370 m2/g, micropore volume 0.16 cc/g, a MSA of 49 m2/g and TPV of 0.36 cc/g. The sample was calcined and NH4 exchanged using a 1M NH4NO3 solution at 75° C. for 1 hr. the final sodium level was 0.002%.

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. A pentasil-layered zeolite having a microporous crystalline structure comprising a framework of AlO$_2$ and SiO$_2$ tetrahedral units, and an empirical composition in the as synthesized and anhydrous basis expressed by the empirical formula of:

$$M_m^{n+}R_r^{p+}Al_{1-x}E_xSi_yO_z$$

where M is at least one exchangeable cation selected from the group consisting of alkali and alkaline earth metals, "m" is the mole ratio of M to (Al+E) and varies from 0 to 3, R is at least one organo cation selected from the group consisting of quaternary ammonium cations, diquaternary ammonium cations, quaternary phosphonium cations, and methonium cations, "r" is the mole ratio of R to (Al+E) and has a value of about 0.1 to about 30, E is an element selected from the group consisting of gallium, iron, boron, indium and mixtures thereof, "n" is the weight average valence of M and has a value of about 1 to about 2, "p" is the weighted average valence of R and has a value of about 1 to about 2, "x" is the mole fraction of E and has a value from 0 to 1.0, "y" is the mole ratio of Si to (Al+E) and varies from greater than 32 to about 200 and "z" is the mole ratio of O to (Al+E) and has a value determined by the equation:

$$z=(m \cdot n+r \cdot p+3+4 \cdot y)/2$$

and wherein the zeolite has a mesopore surface area between 140 m²/g and 400 m²/g, wherein the zeolite is characterized by an x-ray diffraction pattern having at least the d spacing and intensities set forth in the following Table A:

Table A

| 2Θ | d(Å) | I/I$_0$ |
|---|---|---|
| 7.92-7.99 | 11.04-11.31 | m |
| 8.79-8.88 | 9.94-11.09 | m |
| 20.28-20.56 | 4.31-4.35 | w |
| 23.10-23.18 | 3.83-3.84 | vs |
| 23.86-24.05 | 3.69-3.72 | m |
| 29.90-30.05 | 2.97-2.98 | w |
| 45.02-45.17 | 2.00-2.01 | w. |

2. The zeolite of claim 1 wherein M is selected from the group consisting of lithium, sodium, potassium, and mixtures thereof.

3. The zeolite of claim 1 wherein M is a mixture of an alkali metal and an alkaline earth metal.

4. The zeolite of claim 1 wherein R is selected from the group consisting of where R is selected from the group consisting of tetrabutylammonium hydroxide, tetrabutylphosphonium hydroxide, hexamethonium dihydroxide and mixtures thereof.

5. The zeolite of claim 1 wherein R is a halide or hydroxide compound of an organoammonium cation.

6. The zeolite of claim 1 wherein R is a mixture of tetrabutylammonium cation and a quaternary ammonium cation.

7. A process for the production of a pentasil-layered zeolite catalyst, comprising:
    forming a reaction mixture comprising reactive compounds M, R, Al, Si and E; and
    reacting the mixture at reaction conditions, wherein the reaction conditions include a temperature between 80° C. and 150° C., and a reaction time between 10 hours and 5 days, to form a microporous crystalline structure comprising a framework of AlO$_2$ and SiO$_2$ tetrahedral units, and an empirical composition in the as synthesized and anhydrous basis expressed by the empirical formula of:

$$M_m^{n+}R_r^{p+}Al_{1-x}E_xSi_yO_z;$$

wherein the reactive compounds include M, a cation selected from the group consisting of alkali and alkaline earth metals; R, an organoammonium cation selected from the group consisting of quaternary ammonium cations, diquaternary ammonium cations; E is an element selected from the group consisting of gallium, iron, boron, indium and mixtures thereof; and wherein "m" is the mole ratio of M to (Al+E) and varies from 0 to 1, "r" is the mole ratio of R to (Al+E) and has a value of between 0.1 and 30, "n" is the weight average valence of M and has a value of 1 to 2, "p" is the weighted average valence of R and has a value of 1 to 2, "x" is the mole fraction of E and has a value from 0 to 1.0, "y" is the mole ratio of Si to (Al+E) and varies from greater than 32 to 200 and "z" is the mole ratio of O to (Al+E) and has a value determined by the equation:

$$z=(m \cdot n+r \cdot p+3+4 \cdot y)/2$$

and wherein the zeolite has a mesopore surface area between 140 m²/g and 400 m²/g, wherein the zeolite is characterized by an x-ray diffraction pattern having at least the d spacing and intensities set forth in the following Table A:

TABLE A

| 2Θ | d(Å) | I/Io |
|---|---|---|
| 7.92-7.99 | 11.04-11.31 | m |
| 8.79-8.88 | 9.94-11.09 | m |
| 20.28-20.56 | 4.31-4.35 | w |
| 23.10-23.18 | 3.83-3.84 | vs |
| 23.86-24.05 | 3.69-3.72 | m |
| 29.90-30.05 | 2.97-2.98 | w |
| 45.02-45.17 | 2.00-2.01 | w. |

8. The process of claim 7 where R is selected from the group consisting of tetrabutylammonium hydroxide, tetrabutylphosphonium hydroxide, hexamethonium dihydroxide and mixtures thereof.

9. The process of claim 7 wherein R is a halide or hydroxide compound of an organoammonium cation.

10. The process of claim 7 where R is a mixture of tetrabutylammonium hydroxide and a quaternary ammonium cation.

11. The process of claim 7 where M is selected from the group consisting of sodium, potassium, and mixtures thereof.

12. The process of claim 7 where the reaction mixture is reacted at a temperature between 100° C. and 125° C.

13. The process of claim 7 where the reaction mixture is reacted at a temperature between 110° C. and 150° C.

14. A process for the production of an MFI-layered zeolite catalyst having a 2-D structure, comprising:
    forming a reaction mixture containing reactive sources of M, R, Al, Si, and E; and
    reacting the reaction mixture at reaction conditions of 85° C. to 225° C. for a period of time of between 1 day to 15 days the reaction mixture having a composition expressed in terms of mole ratios of the oxides of:

$$aM_{2/n}O:bR_{1\ 2/n}O:cR_{2\ 2/n}:1\text{-}dAl_2O_3:dE_2O_3:eSiO_2:hH_2O;$$

wherein the reactive compounds include M, a cation selected from the group consisting of alkali, alkaline earth metals and mixtures thereof; R, an organoammonium cation selected from the group consisting of quaternary ammonium cations, diquaternary ammonium cations and mixtures thereof; and E is an element selected from the group consisting of gallium, iron, boron, indium and mixtures thereof; Al in the form of Al$_2$O$_3$; and Si in the form of SiO$_2$; wherein "a" has a value of 0.1 to 3, "b" has a value of 1 to 30, "c" has a value of 0 to 1, "d" has a value of 0 to 1, "e" has a value of 64 to 400 and "h" has a value of 50 to 1000; and wherein the zeolite has a mesopore surface area between 140 m$^2$/g and 400 m$^2$/g, wherein the zeolite is characterized by an x-ray diffraction pattern having at least the d spacing and intensities set forth in the following Table A:

TABLE A

| 2Θ | d(Å) | I/Io |
|---|---|---|
| 7.92-7.99 | 11.04-11.31 | m |
| 8.79-8.88 | 9.94-11.09 | m |
| 20.28-20.56 | 4.31-4.35 | w |
| 23.10-23.18 | 3.83-3.84 | vs |
| 23.86-24.05 | 3.69-3.72 | m |
| 29.90-30.05 | 2.97-2.98 | w |
| 45.02-45.17 | 2.00-2.01 | w. |

* * * * *